Feb. 25, 1958  G. A. LYON  2,824,766
WHEEL STRUCTURE

Filed March 3, 1953

Inventor
GEORGE ALBERT LYON
by
Attys.

Feb. 25, 1958  G. A. LYON  2,824,766
WHEEL STRUCTURE
Filed March 3, 1953  2 Sheets-Sheet 2
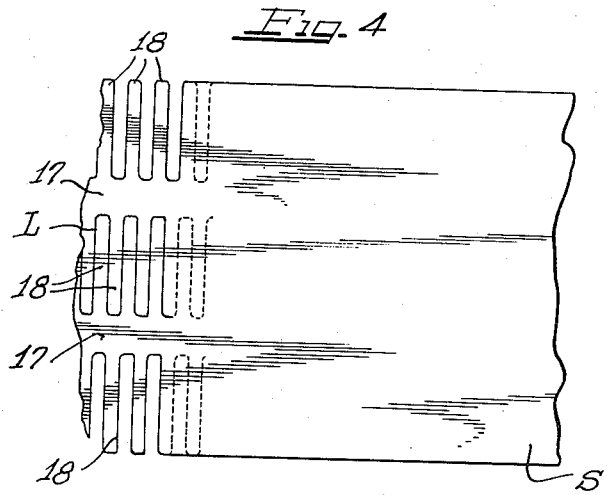
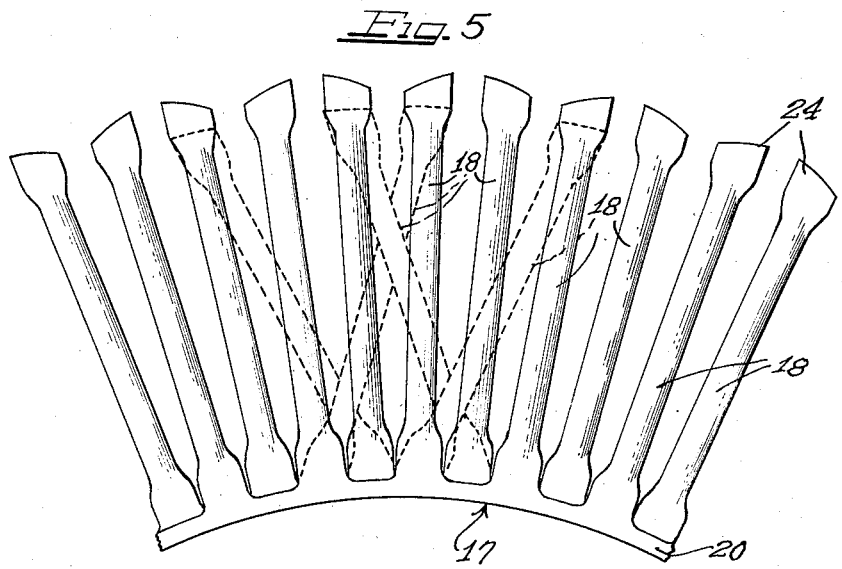
Inventor
GEORGE ALBERT LYON
by
Attys.

United States Patent Office 2,824,766
Patented Feb. 25, 1958

2,824,766
WHEEL STRUCTURE
George Albert Lyon, Detroit, Mich.
Application March 3, 1953, Serial No. 339,978
5 Claims. (Cl. 301—37)

The present invention relates to wheel structures and more particularly concerns the ornamental and protective covering of the outer sides of vehicle wheels.

An object of the invention is to provide a wheel structure having novel cover means on the outer side thereof.

Another object of the invention is to provide a wheel structure having novel means thereon affording simulation of a wire wheel.

A further object of the invention is to provide an improved cover for disposition at the outer side of a vehicle wheel.

Still another object of the invention is to provide a novel wheel cover adapted to afford for the outer side of a disk spider wheel the appearance of it being a wire spoke wheel.

It is a further object of the invention to provide an improved wheel cover embodying a simple and inexpensive arrangement of spoke simulating elements.

Other objects, features and advantages of the present invention will be readily apparent from the following detailed description of a preferred embodiment thereof taken in conjunction with the accompanying drawings in which:

Figure 4 is a fragmentary plan view of a sheet metal strip from which one of the cover components is adapted to be derived as a stamping; and Figure 5 is a fragmentary side elevational view of one of the cover components after it has been partially formed to provide spoke simulating elements.

Figure 2:
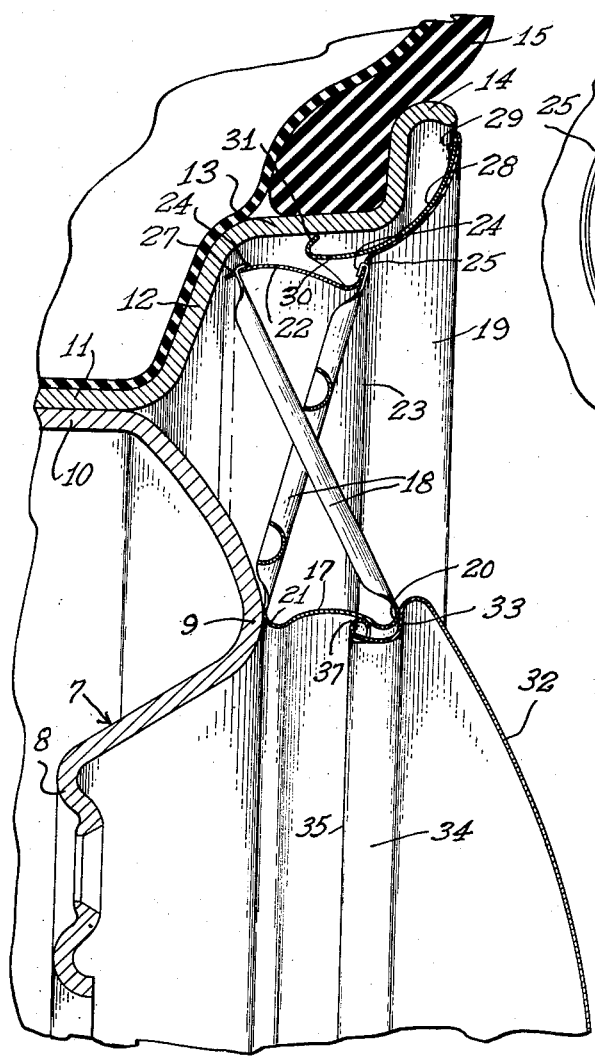
Figure 2 is an enlarged fragmentary sectional view taken substantially on the line II—II of Figure 1.

A wheel to which the present invention is especially applicable comprises a disk spider body 7 having a central bolt-on flange 8, an intermediate annular axially outwardly projecting reinforcing nose bulge 9 and an outer marginal generally axially inwardly directed attachment flange 10. Supported by the wheel is a tire rim preferably of the multi-flange, drop center type having a base flange 11 suitably attached to the attachment flange 10 and merging with an outer side generally axially and radially outwardly directed side flange 12. Merging with the side flange is an intermediate generally axially outwardly directed and slightly radially oblique flange 13 which joins at its outer margin a terminal flange 14. The flange structure is adapted to support a pneumatic tire and tube assembly 15.

In ornamental and protective relation at the outer side of the wheel is a wheel cover which will afford the illusion of the wheel being a wire spoke wheel although the advantages of economy and sturdiness inherent in a disk spider wheel are retained. To this end, the cover herein comprises an inner annular generally axially extending and preferably tubular-body cover member 17 which is joined by integral spoke simulating extensions 18 to an outer annular large diameter cover member 19. The cover member 17 is adapted to overlie the wheel body and more especially the nose bulge 9 of the wheel body, while the outer annular cover member 19 is adapted to lie opposite the tire rim. The general organization of the cover members is such as to afford the illusion of the inner cover member 17 being part of the hub of a wire wheel, while the cover member 19 gives the illusion of being part of the tire rim of such a wheel.

According to the present invention, the spoke simulating extensions 18 are provided in two axially spaced, respectively crossing series. One series of the spoke elements 18 comprises integral one-piece symmetrically spaced and angled extensions from an axially outer marginal generally radially outwardly turned flange 20 on the cover member 17. The inner series of spoke elements 18 comprises integral one piece symmetrically angled and spaced extensions from an inner marginal annular generally radially outwardly turned flange 21 on the cover member 17. As will be observed in Figure 2, the flanges 20 and 21 are of preferably transversely arcuate, annularly rib-like structure whereby to afford substantial rigidity for the ring-like, tubular body of the cover member 17. In addition, the intermediate portion of the cover body 17 is preferably arcuately bowed radially outwardly to afford an intermediate rigidifying rib and a radially inwardly opening annular groove.

Figure 1:
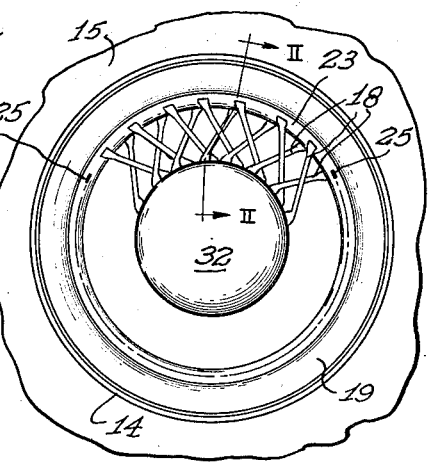
Figure 1 is a side elevational view of a wheel structure embodying the invention.

The cover member 17 is preferably formed from suitable sheet metal such as stainless steel or brass or the like and is adapted to be made from a continuous strip S of the sheet metal (Figure 4). For economy, the sheet metal strip S may be wide enough to derive a plurality of cover members 17 therefrom, two being shown in Figure 4 cut with the spoke elements 18 of the adjacent cover member strips 17 alternating by separation along a symmetrical sinuous line L. At the opposite margins of the strip S, of course, portions of the strip margin will have to be notched out to provide the spoke extensions 18. After the cover strips 17 have been severed from the continuous strip S, they are cut to proper length. Either before or after the cover strips 17 have been severed to proper length, the spoke elements or extensions 18 thereof are appropriately shaped such as to afford a transversely arcuate contour such as half round, as shown, or three quarter round or full round, as preferred. Thereafter, the cover strip 17 is bent into ring form and the ends thereof may be connected as by butt welding and the spoke elements 18 are directed radially outwardly by turning of the marginal flanges of the cover member 17 radially outwardly, substantially as indicated in full line in Figure 5. Finally, the inner and outer spoke elements 18 are directed into not only peripherally crossing relation but also axially crossing relation substantially as indicated in dash outline in Figure 5 and in full outline in Figures 1 and 2. The transverse contour of the ring body of the cover member 17 may be rolled therein.

The outer annular tire rim covering member 19 is preferably constructed from suitable sheet material such as stainless steel or brass and with the outer marginal portion thereof of preferably concave convex cross-section to overlie the terminal flange 14 of the tire rim and extend in spaced relation about the juncture shoulder where the intermediate flange 13 and the terminal flange meet. An inner generally axially extending marginal flange 22 on the cover member 19 joins the outer portion thereof on a preferably generally radially and axially outwardly oblique intermediate annular shoulder 23 which faces generally axially outwardly step-like. Behind the shoulder 23, the inner marginal flange portion preferably is concavely shaped transversely for rigidity.

Attachment of the spoke elements 18 to the cover member 19 is effected through the medium of respective terminal flanges 24 on the outer ends of the spoke elements. The terminal flanges 24 on the inner series of spoke elements that extend from the inner marginal flange 21 of the inner cover member are attached to the outer cover member 19 through respective slots 25 provided therefor in the shoulder 23, the terminal flanges 24 being bent over into crimped relation to the margin defining the respective apertures. The terminal flanges 24 of the spoke elements extending from the outer marginal flange 20 of the inner cover member extend through respective slots 27 in the inner margin of the flange 22 and are bent over into interlocking relation to the margins of the respective slots 27, substantially as shown in Figure 2. Through this arrangement, the cover ring members 17 and 19 are fixedly connected together and by virtue of the diagonally crossing strut complementary disposition of the two series of rigid spoke elements 18, the assembly of the two cover members is fairly rigidly maintained.

For attachment of the cover assembly comprising the cover members 17 and 19 to the wheel, means are provided such as a rigidifying and retaining flange 28 nested behind the outer marginal portion of the cover member 19 and secured thereto as by means of an underturned or return bent outer edge extremity reinforcing and finishing flange 29 on the cover member 19, as best seen in Figure 2. At its inner marginal extremity, the flange member 28 is provided with a series of retaining finger extensions 30 which have short and stiff generally radially and axially outwardly oblique retaining finger extensions 31 which are engageable under resilient tensioning thrusting grip with the inner face of the intermediate flange 13 of the tire rim. The retaining finger extensions 30 are resiliently flexible in a radial direction in the space between the intermediate flange 13 and the inset inner marginal flange 22 of the outer cover member. Thereby, the retaining fingers 30 are resiliently deflectable as an incident to camming of the terminals 31 thereof inwardly along the intermediate flange as an incident to pressing the cover into position on the wheel. Removal of the cover is easily effected by inserting a pry-off tool behind the multi-layer outer marginal formation of the cover and the terminal flange 14 and exerting pry-off force to dislodge the retaining fingers 30 and more particularly the retaining terminals 31 thereof from the intermediate flange by generally axially outward pry-off leverage applied to the cover.

In the fully applied condition of the cover, the inner marginal turned flange 21 of the inner cover member bottoms or shoulders against the nose bulge 9 of the wheel body.

Figure 3:
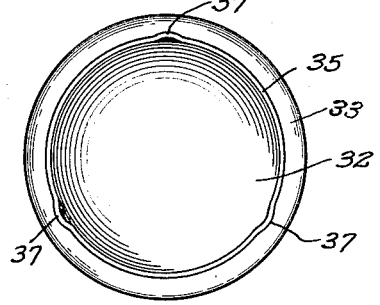
Figure 3 is a reduced size rear elevational view of a hub cap member has adapted to be utilized as part of the cover assembly of Figures 1 and 2.

For closing the central opening defined by the tubular ring cover member 17, a hub cap 32 is provided having an underturned marginal shoulder flange 33 dimensioned to seat against the annular outer marginal flange 20 of the cover member 17. For retaining the hub cap in snap-on, pry-off relation on the cover member 17, the flange 33 has an axially inwardly extending annular portion 34 provided with an outturned bead 35 having at spaced intervals such as three intervals as best seen in Figure 3, radially outwardly extending retaining bumps or protrusions 37 adapted to snap retainingly behind a shoulder 38 provided at the axially outer side of the groove defined by the bowed body of the ring cover member 17 adjacent to the turned axially outer marginal flange 20.

It will be understood that modifications and variations may be effected without departing from the scope of the novel concepts of the present invention.

I claim as my invention:

1. In a cover for disposition at the outer side of a vehicle wheel, radially spaced inner and outer cover members, one of said cover members having on the face thereof that opposes the other cover member an intermediate axially outwardly facing step-like ledge, the other of said cover members having spoke extensions therefrom with end portions resting against and secured to said ledge.

2. In a wheel structure including a wheel body and a multi-flanged tire rim having a side flange merging with a generally radially and axially outwardly directed intermediate flange leading into a terminal flange at the axially outer side of the tire rim, a cover for disposition at the outer side of the wheel comprising an inner annular cover portion for resting against the wheel body and having generally radially outwardly directed spoke extensions therefrom, an annular radially outer cover portion substantially radially spaced from said inner cover portion and extending generally radially and axially inwardly and arranged for substantially concealing disposition opposite the terminal flange and intermediate flange and lying in spaced relation to both of said flanges, said spoke extensions being connected to said outer annular cover portion and thereby connecting the cover portions together, and means behind said outer annular cover portion retainingly engageable with the intermediate flange for retaining the cover on the wheel with said inner annular cover portion in abutting relation to the wheel body.

3. In a cover for disposition at the outer side of a vehicle wheel, a sheet metal annular cover portion of tubular form having generally radially outwardly projecting annular flanges at the opposite ends thereof provided with spoke extensions therefrom integral in one piece therewith, an internal shoulder on the axially outer portion of said tubular cover portion providing a retaining shoulder for a hub cap having an underturned retaining flange structure engageable in snap-on pry-off relation with said internal shoulder and arranged to rest in assembly upon the axially outer of said radially turned flanges, and a circular cover member of substantially larger diameter than said tubular cover portion, said circular cover member having a generally axially extending portion provided with an intermediate shoulder and an axially inner flange portion, the spokes from the axially outer flange of said inner cover portion being connected at their ends to said outer cover member flange and the spokes from the axially inner flange of the inner cover portion being connected to said intermediate shoulder of the outer cover member, said spokes being disposed in respectively axially and circumferentially crossing relation, and means for attaching the cover to a wheel.

4. In a cover for disposition at the outer side of a vehicle wheel, a sheet metal annular cover portion of tubular form having generally radially outwardly projecting annular flanges at the opposite ends thereof provided with spoke extensions therefrom integral in one piece therewith, and a circular cover member of substantially larger diameter than said tubular cover portion, said circular cover member having a generally axially extending portion provided with an intermediate shoulder and an axially inner flange portion, the spokes from the axially outer flange of said inner cover portion being connected at their ends to said outer cover member flange and the spokes from the axially inner flange of the inner cover portion being connected to said intermediate shoulder of the outer cover member, and means for attaching the cover to a wheel.

5. In a cover for disposition at the outer side of a vehicle wheel including a wheel body and a tire rim having a radially inwardly facing annular flange, an annular cover portion for overlying the tire rim and having a radially outer marginal part thereof extending generally radially inwardly for overlying the rim flange and an axially inwardly extending part for disposition in generally telescoped radially inwardly spaced relation to the rim flange, said annular cover portion having intermediately thereof and adjacent juncture of the axially and radially extending parts thereof an insetting portion by which at least the major extent of said axially extending part is inset substantially relative to the contiguous portion of the radially extending part, and a cover retaining structure carried by said annular cover portion and comprising a generally ring shaped portion disposed in nested relation behind said radially extending part and with cover retaining resilient fingers extending generally axially inwardly opposite said inset portion and projecting beyond said insetting portion, said inset portion thereby remaining spaced radially inwardly from the fingers and enabling radial flexure of the fingers upon engagement of retaining terminals on the fingers with the rim flange, said radially inward flexure being substantially resiliently stiffened by the backing up of the ring portion against the cover portion to the point where the fingers project axially inwardly beyond said insetting portion.

References Cited in the file of this patent

UNITED STATES PATENTS

| | | |
|---|---|---|
| 2,013,895 | Pannecoucke et al. | Sept. 10, 1935 |
| 2,062,841 | Stefancky | Dec. 1, 1936 |
| 2,433,854 | Lyon | Jan. 6, 1948 |
| 2,434,940 | Lyon | Jan. 27, 1948 |
| 2,440,638 | Lyon | Apr. 27, 1948 |
| 2,709,113 | Plotkin | May 24, 1955 |

FOREIGN PATENTS

| | | |
|---|---|---|
| 714,587 | France | Sept. 7, 1931 |